(12) United States Patent
Gusat et al.

(10) Patent No.: US 8,345,548 B2
(45) Date of Patent: Jan. 1, 2013

(54) METHOD OF SWITCHING FABRIC FOR COUNTERACTING A SATURATION TREE OCCURRING IN A NETWORK WITH NODES

(75) Inventors: Mircea Gusat, Adliswil (CH); Marc Verhappen, Langnau am Albis (CH); Cyriel Minkenberg, Adliswil (CH); Jose Dusto, La Eliana (ES)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/167,580

(22) Filed: Jul. 3, 2008

(65) Prior Publication Data

US 2008/0273465 A1 Nov. 6, 2008

(30) Foreign Application Priority Data

May 28, 2004 (EP) .................................. 04405332

(51) Int. Cl.
*G01R 31/08* (2006.01)
*G06F 15/173* (2006.01)

(52) U.S. Cl. ........ 370/230; 370/235; 370/413; 709/232; 709/235

(58) Field of Classification Search .................. 370/230, 370/230.1, 235, 236, 413; 709/232, 235
See application file for complete search history.

(56) References Cited

U.S. PATENT DOCUMENTS

| 6,424,624 | B1 * | 7/2002 | Galand et al. ................. 370/231 |
| 6,590,865 | B1 * | 7/2003 | Ibaraki et al. ................. 370/230 |
| 6,973,032 | B1 * | 12/2005 | Casley et al. ................. 370/230 |
| 7,224,669 | B2 * | 5/2007 | Kagan et al. ................. 370/230 |
| 7,242,668 | B2 * | 7/2007 | Kan et al. ..................... 370/234 |
| 2001/0012269 | A1 * | 8/2001 | Nakamura et al. ............ 370/230 |
| 2002/0136163 | A1 * | 9/2002 | Kawakami et al. ........... 370/229 |
| 2004/0090918 | A1 * | 5/2004 | McLendon .................... 370/237 |
| 2004/0223452 | A1 * | 11/2004 | Santos et al. ................. 370/229 |
| 2005/0105466 | A1 * | 5/2005 | Chase et al. ................. 370/230 |
| 2005/0135254 | A1 * | 6/2005 | Taylor et al. ................. 370/237 |

* cited by examiner

*Primary Examiner* — Michael Thier
*Assistant Examiner* — Awet Haile
(74) *Attorney, Agent, or Firm* — Michael J. Buchenhorner; Vazken Alexanian (57) ABSTRACT

An example of a method comprises the steps of generating at a local node where a congestion emerges a first congestion information; sending the first congestion information to at least one upstream node; responsive to one received first congestion information comparing the content of the received first congestion information with a present local status based on a set of predefined rules in order to identify at least one packet stream causing the congestion, and generating a second congestion information comprising the identified at least one packet stream causing the congestion; and sending the second congestion information to at least one further upstream node from where the identified at least one packet stream was received.

12 Claims, 4 Drawing Sheets

Legend:
buffer - 16
processor - 19
additional memory - 60

METHOD OF SWITCHING FABRIC FOR COUNTERACTING A SATURATION TREE OCCURRING IN A NETWORK WITH NODES

TECHNICAL FIELD

The present invention relates to a method for counteracting saturation trees occurring in switch-based information networks.

BACKGROUND OF THE INVENTION

Packet blocking and flow interference in packet-switched interconnects lead to congestion and saturation trees that could cause performance collapse. Non-interfering architectures with independently flowing data flows were practically approximated by static-a priori definition and reservation of end-to-end resources, e.g. links, virtual channels/lanes, buffers, queues, that are allocated to the data flows. Such approaches are effective, although heavy in overhead and limited in scalability.

Other approaches, such as the asynchronous transfer mode (ATM) and IP can prevent saturation trees by sacrificing losslessness. The general method to attain a scalable and stable network architecture as used in TCP/IP and ATM networks builds on end-to-end flow control, window- or rate-based, respectively. The main detractor here is convergence speed because of long delays. Whereas a reaction time of milliseconds is adequate for large/slow networks, server and storage interconnection networks require microsecond solutions or faster, to prevent saturation trees and catastrophic performance degradation. Thus, this method is more appropriate for long-lived (static) congestion than for short-lived (dynamic) congestion management. In such an environment, congestion leads to excessive loss (drop) rates.

In non-provisioned interconnection networks (SAN, StAN, HPC etc.), congestion control is considered as one of the difficult challenges. Non-interfering architectures are described by G. F. Pfister and V. A. Norton, "Hot Spot Contention and Combining in Multistage Interconnection Networks", IEEE Trans. on Computers, Vo. C-34, No. 10, October 1985, pp. 933-938; or by W. Dally, "Virtual-Channel Flow Control", IEEE Trans. on Parallel and Distributes Systems, Vol. 3, No. 2, March 1992, pp. 194-205.

Dynamic non-interference via reactive flow and congestion control remains an open issue of increased interest for supercomputer, server and storage interconnection networks. Reactive flow and congestion control is a hard space-time problem, because an average network with (tens of) thousands of nodes should resolve contention between many flows sharing the interconnection network's resources. The issue is how to disseminate accurate and timely status information to all traffic participants, i.e. a large address-space identifying flows and their resource allocations should be communicated with low latency—globally—or if possible, on a need-to-know basis.

U.S. Pat. No. 5,768,258 describes a selective congestion control mechanism for information networks to mitigate the loss rate. The congestion control mechanism is especially used for ATM networks supporting data services or other non-reserved bandwidth traffic. The control mechanism reacts upon detection of a traffic bottleneck by selectively and temporarily holding back the data traffic that is to travel via the bottleneck. A congested node transmits congestion notifications containing one routing label information per flow and deferment information to upstream nodes, thus enabling a selective temporary backpressure action. For detecting a congestion, the buffer occupancy of an output port of a node is monitored and if the occupancy exceeds a given threshold, congestion is detected. A communication and switch-based ATM network is connection-oriented and all ATM cells belonging to a connection follow the same path by swapping the routing labels at the input port of each switch. Thus, the actual routing decisions take place only during connection and set-up and routing is not considered as a critical issue in the ATM environment. Upstream switching nodes are informed on a hop-by-hop basis about the traffic flows that should be back-pressured to attenuate the congestion. The congestion notification comprises the information that selected cells that flow via the bottleneck link have to be held back for a duration of time. In fact, this induces saturation trees.

In the known congestion controlling methods a tree of upstream nodes is blocked if a congestion globalizes. There is no differentiation between data packets that cause the congestion (culprits) and data packets that are only victims of the congestion if "culprits" and "victims" share the same buffer. With VPI/VCI labelling, only one label can be used per flow, i.e. the selectivity is fixed.

In addition to the prior art, it is a general object of this invention to provide a method to dynamically counteract against saturation trees in a lossless packet-switched multi-stage interconnection network. It is a further object of the invention to rapidly attenuate dynamic congestion in interconnection networks (SAN, clusters, supercomputers) by providing on-demand resource non-interference. It is a further object of the invention to provide a scheme that counteracts saturation trees, prevents buffer overflows, and underflows and that enables more efficient use of the switching capacity of a switching network. Whereas the prior art also performs a selective form of backpressure with fixed granularity, it is an object of the invention to adapt the granularity of the selection to reduce the congestion signalling overhead. Efficiency is better with variable granularity.

SUMMARY OF THE INVENTION

The present invention provides a selective congestion control mechanism that provides dynamic reactive congestion control that could be used for example in a buffered crossbar, CIOQ, shared-memory and any other switch architecture.

According to one aspect of the invention, there is provided a method for counteracting a saturation tree occurring in a network having nodes, wherein data packet streams are transmitted over the nodes. Each node has at least one input and one output, wherein the data packets are received at an input of the node, and emitted over a predetermined output of the node, depending on the destination of the data packet. The method comprises the steps of generating at a local node where a congestion emerges a first congestion information; sending the first congestion information to at least one upstream node; in response to one received first congestion information comparing the content of the received first congestion information with a present local status based on a set of rules in order to identify at least one packet stream causing the congestion (culprits), and generating a second congestion information comprising the identified at least one packet stream causing the congestion, i.e. the second congestion information indicates the identified packet streams (culprits); and sending the second congestion information to at least one further upstream node from where the identified at least one packet stream was received.

In accordance with a further aspect of the invention, there is provided a switching fabric for counteracting a saturation tree occurring in a network having nodes. A switching fabric comprises a first processing unit and a first memory adapted to generate at a local node where a congestion emerges a first congestion information, a first port controlled by the first processing unit for sending the first congestion information to at least one upstream node, a second processing unit and a second memory adapted to compare the content of the received first congestion information with a present local status based on a set of predefined rules in order to identify at least one packet stream causing the congestion, and to generate a second congestion information comprising the identified at least one packet stream causing the congestion, and a further port for sending the second congestion information to at least one further upstream node from where the identified at least one packet stream was received.

Advantageous results are attained by recalculating the hold time in nodes upstream from the congestion root before sending a congestion message from such nodes. For the recalculation of the hold time the local circumstances of round-trip time and buffer occupancies are considered.

BRIEF DESCRIPTION OF THE DRAWINGS

Embodiments of the invention are described in detail below with reference to the drawings. To show more clearly the general inventive concept, an implementation in a typical switching scenario is assumed.

DETAILED DESCRIPTION OF THE INVENTION

The present invention discloses a selective congestion control mechanism that provides dynamic reactive congestion control that could be used for example in a buffered crossbar, CIOQ, shared-memory and any other switch architecture. According to the invention, there is provided a method for counteracting a saturation tree occurring in a network having nodes, wherein data packet streams are transmitted over the nodes. Each node has at least one input and one output, wherein the data packets are received at an input of the node, and emitted over a predetermined output of the node, depending on the destination of the data packet. The method comprises the steps of generating at a local node where a congestion emerges a first congestion information; sending the first congestion information to at least one upstream node; in response to one received first congestion information comparing the content of the received first congestion information with a present local status based on a set of rules in order to identify at least one packet stream causing the congestion (culprits), and generating a second congestion information comprising the identified at least one packet stream causing the congestion, i.e. the second congestion information indicates the identified packet streams (culprits); and sending the second congestion information to at least one further upstream node from where the identified at least one packet stream was received.

The step of sending the second congestion information can comprise forwarding the second congestion information to a source node from which the identified at least one packet stream originates. This allows to directly inform the source node, e.g. to stop the packet stream, while this can be achieved faster than the saturation tree develops.

In an advantageous embodiment the first congestion information comprises an identifier identifying a congested route, e.g. a port or channel. The first congestion information is sent upstream. When an upstream node receives the first congestion information it stores the identifier in dependence on the set of rules in one of a first list, herein also referred to as blacklist (BL), indicating the data stream causing the congestion and a second list, herein also referred to as graylist (GL), indicating data streams suspected of causing congestion.

The second congestion information can comprise the identifier or comprise groups of identifiers of data flows, i.e., labelling multiple data flows or streams. The second congestion information is sent further upstream, where a further upstream node receives the second congestion information and stores the identifier in dependence on the set of rules in the first list (BL) or the second list (GL). It is advantageous that the identifier can identify multiple data flows as a so-called congestion culprit set (CC-set), because this reduces the congestion information sent around the network.

The step of generating a first congestion information at a local node can further comprise detecting the emerging congestion by applying the set of predefined rules. In an advantageous embodiment each node comprises the set of predefined rules for detecting an emerging congestion. However, it depends on the conditions of the set of predefined rules which congestion information is generated or which list is used.

Further, based on the set of predefined rules each identifier of incoming packet streams can be compared with the identifiers stored in the second list (GL). When a condition of the set of predefined rules with respect to one identifier holds or is valid, then said identifier is transferred from the second list (GL) to the first list (BL). The respective node is then aware of packet streams causing congestion and can inform other nodes about those streams.

The second congestion information with the identifier can be sent upstream if the identifier is stored more than once in the first list (BL). This has the advantage that the upstream nodes are informed and can react accordingly.

A receiving source node, i.e., the node where the packet stream causing the congestion stems from, reduces the sending rate of the packet stream identified and sends a test packet to the local node where the congestion emerged. Thereby entries of the received identifier in the second lists (GL) can be removed along the way of the test packet to the local node where the congestion emerged. This helps to clear up the entries in the second lists (GL). Entries in the first list (BL) are self-cleaning as these comprise an expiring time t after which the entry is removed.

In the invention, there is also provided a switching fabric for counteracting a saturation tree occurring in a network having nodes. The switching fabric comprises a first processing unit and a first memory adapted to generate at a local node where a congestion emerges a first congestion information, a first port controlled by the first processing unit for sending the first congestion information to at least one upstream node, a second processing unit and a second memory adapted to compare the content of the received first congestion information with a present local status based on a set of predefined rules in order to identify at least one packet stream causing the congestion, and to generate a second congestion information comprising the identified at least one packet stream causing the congestion, and a further port for sending the second congestion information to at least one further upstream node from where the identified at least one packet stream was received. The switching fabric can further comprise a first list (BL) for storing identifiers indicating data streams causing the congestion and a second list (GL) for storing the identifiers indicating data streams suspected of causing congestion.

Each of the congestion information, also referred to as congestion message, can be sent to upstream nodes of a previous stage from which data packets were received by the local or congested node. The upstream nodes that receive the identifier store the identifier and after receiving the congestion message, the upstream node can hold back the data packets or streams with the stored identifiers and lets pass the data packets with different identifiers to the local or congested node. The advantage of this is that only the data packets that are congestion suspects are held back. Therefore, not a whole node is blocked by the congestion message, but only the data packets that cause the congestion are blocked. Therefore, other data packets can still be transmitted to the node at which a congestion arose.

In an advantageous embodiment, the first congestion information or message is only sent to nodes from which congesting data packets were received. Therefore, less information has to be transmitted in the network, reducing the traffic. The nodes of a first stage check whether a congestion is emerging and send the identifier of the congesting data packets within the second congestion information or message to nodes multiple stages upstream from which they directly or indirectly receive data packets. Therefore, the data packets that will cause a congestion are withheld more than one stage away from the congested nodes.

The second congestion information or message can comprise an expedite information (scope_K). This allows to transport the second congestion information faster than the saturation tree grows.

In a further embodiment, the congestion information can comprise a hold time during which the upstream nodes will hold back the identified data packets. Therefore, it is not necessary to send a second message to the upstream nodes to resume transmission of the identified data packets if, for example, the congestion is resolved. However, in a further embodiment the retaining of data packets during the hold back time is cancelled by receiving an attracting information, i.e., a special type of flow control (FC) event, such as a qualified credit.

The upstream nodes that receive one congestion message store the hold time and the identifier of the data packets suspected of congestion. Within the hold time the upstream nodes retain the data packets with the stored identifiers. Therefore, only the data packets that will cause the congestion are held back. Data packets with other identifiers are passed to the node from which the congestion message was received. Therefore, the data traffic is constrained only as much as necessary.

In a further advantageous embodiment, a data packet flow, also referred to as stream, to which the data packets suspected of congestion belong is determined as identifier for the congesting data packets. The data flow or packet stream can be detected by analyzing the header of a data packet. An example of marking suspect data packets is checking the free capacity of a memory portion for a given output port. Another example is to mark data packets with the highest memory occupancy of a given output port with an emerging congestion. In both examples, the identifiers of the marked data flows or packet streams are sent to an upstream node.

In another advantageous embodiment, an emerging congestion is checked and controlled individually for each output port of a first or local node.

In an advanced embodiment the congestion message is sent upstream several nodes without checking in each upstream node whether there is a local emerging congestion. This assists in sending upstream the congestion message sooner than the spreading of the saturation trees. In this embodiment, the congestion message has no specified duration during which data packets should be withheld. This message is then interpreted as a notification of a suspect packet or data flow.

Further advantageous results are attained by recalculating the hold time in nodes upstream from the congestion root before sending a congestion message from such nodes. For the recalculation of the hold time the local circumstances of round-trip time and buffer occupancies are considered.

In switch-based networks, it may occur that during a period of time a switch receives more data packets than it can handle. If the aggregate incoming rate of data packets is larger than the outgoing data rate, a bottleneck exists at this switch. In order to prevent a congestion with a large saturation tree that greatly deteriorates general network performance, a method for counteracting saturation trees is provided in such networks.

Figure 4:
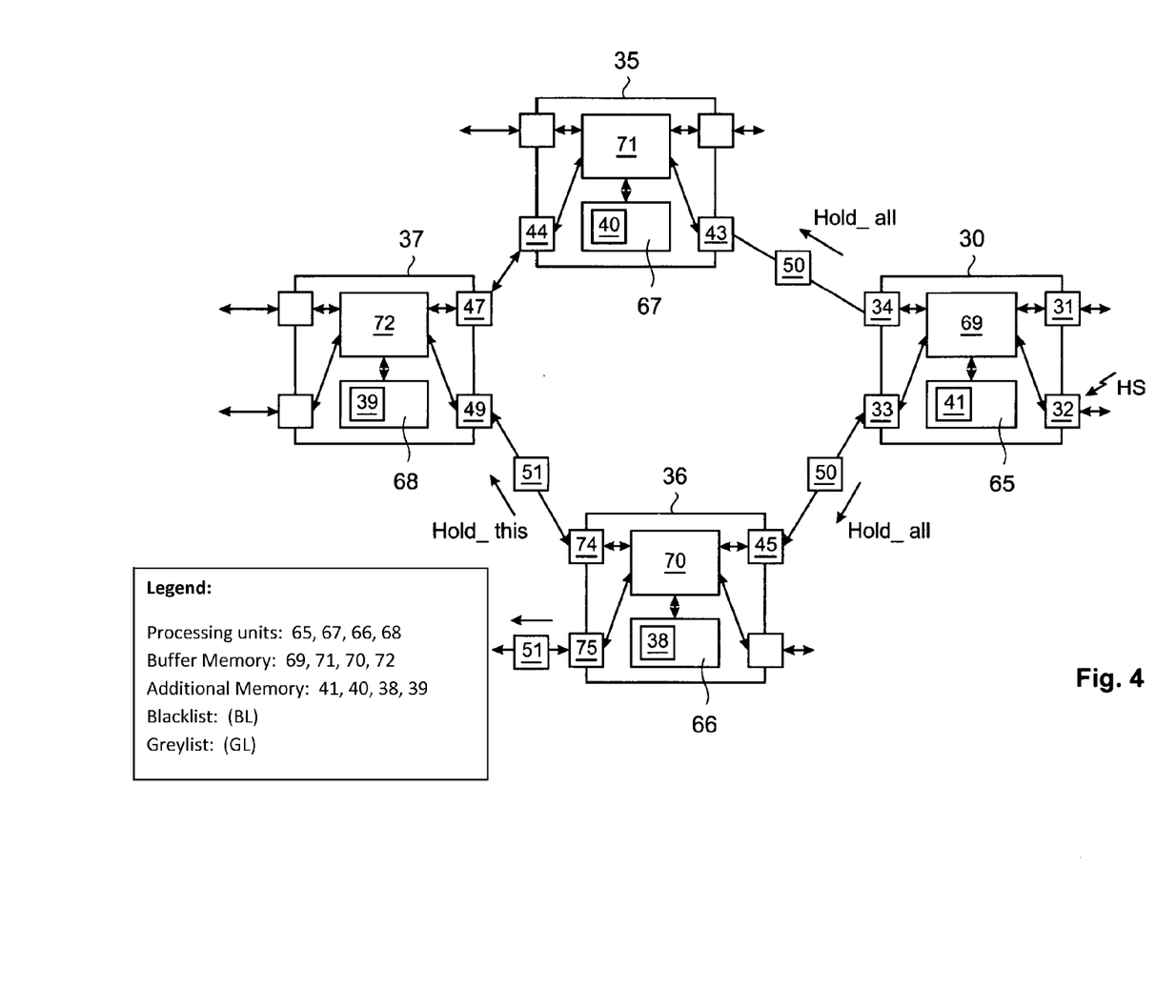
FIG. 4 depicts a further network with four nodes.

Before other embodiments are described, some general issues with respect to the present invention are addressed with reference to FIG. 4. FIG. 4 depicts an embodiment with a local or fourth node 30, a fifth node 35, a sixth node 36 and a seventh node 37. Each of the fourth, fifth, sixth, seventh node 30, 35, 36, 37 comprises two input ports 33, 34; 44; 74, 75 and two output ports 31, 32; 43; 45; 47, 49 and further a fourth, fifth, sixth, seventh processing unit 65, 67, 66, 68 and a fourth, fifth, sixth, seventh memory 69, 71, 70, 72 for storing data packets, respectively. Each processing unit 65, 67, 66, 68 has access to an additional memory 41, 40, 38, 39 wherein a first list (BL), herein also referred to as blacklist, and a second list (GL), herein also referred to as greylist, is provided. The black- and greylist can also be stored or provided in the buffer memory 69, 71, 70, 72. The input and the output ports of the nodes are connected with bidirectional links for sending and receiving data packets. The fourth node 30 with the seventh output port 32 is contemplated as a hotspot, labelled with HS, where a congestion occurred. The fourth node 30 is connected upstream by the seventh input port 33 with output port 45 of the sixth node 36. The fourth node 30 with the eighth input port 34 is connected with the output port 43 of the fifth node 35. The sixth node 36 is connected by the input port 74 to the output port 49 of the seventh node 37. Each of the nodes 30, 35, 36, 37 is embodied as a double input and output switching system. Depending on the destination address of the data packets, the nodes 30, 35, 36, 37 transmit the data packets that were received by the input ports to one of the output ports.

Elements of Bipolar Flow Control (BFC)

When referring to a congestion or information message it can be one of three types (1), (2), (3) which are flow control (FC) messages sendable in-bound within the network. A first congestion information or message (1), labeled in FIG. 4 with 50, and also denoted as Hold_all message or signal is used and defined in more detail below. Further, when referring to a second congestion information or message (2), (3), labeled in FIG. 4 with 51, one of two types of a Hold_this message or signal is used which are defined in more detail below.

In general, there are three types of flow control messages: Hold_all(node|port_ID, t, info), Hold_this(set|flow_ID, t), and Hold_this(set|flow_ID, info).

(1) Congested signal: The Hold_all(node|port_ID, scheduling horizon, info) message applies to all data packets going to an indicated hotspotted downstream output port. The Hold_all message is sent upstream from the node with the hotspotted output, i.e. from the root of a saturation tree (e.g. the seventh output port 32 of the fourth node 30). The Hold_all travels one stage upstream (to nodes 35, 36). It does not necessarily comprise any specific flow identifiers, but an output port number (of the seventh output port 32). For efficiency, the flow identifiers of all the packet flows or streams destined for that output port 32 are not put on a blacklist. During a horizon duration the withholding is performed at transmission schedulers (TXS) (in nodes 35 and 36) which control which data packets are allowed to travel on the links to the downstream node. The transmission schedulers (TXS) are not shown for simplicity. The info field is described below.

(2) Congesting_culprit signal: The Hold_this (flow|set_identification, scheduling horizon, info) message applies to so-called culprit packets (deemed as causing congestion) and going to at least one end destination address. These packets are identified by the flow identification (found in data packet headers). The end destination address of the flow identification is placed as identifier in an entry on the blacklist. As explained below in the (congestion culprit) CC-set, to reduce flow control signalling overhead, any flow identification can represent a multitude of flows sharing at least one congested segment. The Hold_this messages are typically sent by nodes in stages upstream from the root of the flow control (FC) (nodes left of node 30). Any of these nodes may (re)calculate its corresponding scheduling horizon for blacklisted packets, i.e., saturation tree culprits. The info field is described below.

(3) Congesting_suspect signal: Hold_this (flow|set_identification, info) message applies to packets suspected of causing the hotspot and going to at least one end destination address. Such packets are to be placed on a graylist, from where they can be upgraded to the blacklist, contingent upon the set of rules. The set of rules are usually a set of predefined rules.

info={HS_severity, scope_K, update}, where,

HS_severity=ratio of aggregate arrivals vs. the hotspot service rate (8-64 bit). Can be also approximated in a 2-bit field: 0—urgent; 1—very severe; 2—severe; 3—medium;

scope_K=number of stages to propagate this message; 0=>immediate propagation to sources, bypass any checks and recalculations; default=1 (single hop, with per node revalidation); 2, 3 ... hops direct.

update=how fresh are the HS_severity, scheduling horizon fields. If update=0, this is an original message content, as it was initially issued; otherwise the fields were updated at every stage.

Typically, any root node can issue the first congestion information or message (1). From the next stage upstream, the nodes issue the second congestion information or message (2), (3), which will be propagated upstream according to the scope_K field: expedited (direct to sources), multihop skip, or hop-by-hop.

Calculation of Scheduling Horizons "t" for Different Flow Control (FC) Messages

Hold or deferment times are also called "scheduling horizons" for the upstream transmission scheduler(s) (TXS).

(A) Calculation of the scheduling horizon for the Hold_all (output port number, scheduling horizon) message takes place in the node that is the root of the tree. The scheduling horizon T=max(NCP-RTT,0), where NCP is a number of cold packets, i.e. packets not considered of causing congestion, and RTT a round trip time. The message is preferably only sent when T is not zero.

(B) The (re)calculation of the scheduling horizon of the Hold_this(flow identification, scheduling horizon) message is based on the local NCP, and on the local RTT with the next upstream node (e.g. the sixth node 36 would take its local NCP and the RTT of the link connecting the nodes 36, 37). A further scheduling horizon T'=max(NCP-RTT,0), where NCP is calculated differently from (A). Here, NCP is the number of non-hotspotting packets expected to keep flowing (out of the sixth node 36) while the Hold_this message travels upstream (to the seventh node 37) and while the scheduling horizon is active (in node 37) and while new data packets are travelling downstream after the scheduling horizon expiry (from the seventh node 37 via the link to the sixth node 36). Since only data packets of specific black-listed flows are held, and not all data packets destined for a particular downstream output port, the NCP in a non-root node is defined as "all currently locally available data packets not belonging to blacklisted flows". NCP for an output (e.g the output of the sixth node 36) is calculated as follows: NCP=(the sum of all currently present data packets for this output) minus (the sum of currently present data packets belonging to blacklisted data flows for this output).

Black- and Graylists

As indicated above, each node has in the additional memory 41, 40, 38, 39 a blacklist, short BL, and an optional graylist, short GL, which can be implemented as a table. The BL table stores the set|flow IDs and scheduling horizons of already known hotspot culprits, i.e. packets deemed as causing congestion, while the GL does the same for suspects, i.e. packets that are suspected of causing congestion. However, as graylisted flows have no scheduling horizons associated with, they will not expire after t. Instead, a GL entry can be either upgraded to BL (new culprit, with default t=RTT), or cleared later on by a special test packet from the source or source node. A so-called garbage collection method can clean the stale GL entries. Typically, one blacklist (BL) is provided and therefore stored per output port.

Blacklist

As mentioned, each node comprises one blacklist. All data packets belonging to a black-listed flow are held at an output until its current scheduling horizon expires. A basic blacklist entry shows the following format: Blacklist Entry=(flow identification, scheduling horizon, occupancy count). In order to (re)calculate the scheduling horizon for Hold_this (flow identification, scheduling horizon) messages, each blacklist entry comprises an occupancy count next to the flow identification and the scheduling horizon. Each time a data packet enters the node at any input port and if it is destined for an output port that has a blacklist entry for the flow this packet belongs to, the occupancy count is increased by one. The static sum of all blacklist occupancy counts for an output port is the second term in the above NCP calculation for Hold_this messages; static sum, because for efficiency only the 1st order approximation is calculated, namely the scheduling horizons that qualify each blacklist entry is disregard therefore the counters's sum a static snapshot. When the scheduling horizon expires, the entry and thus the count is cleared. When a new entry is added to the blacklist, the occupancy count is initialized to zero.

Graylist

The graylist is built with suspects identified by "Congesting_suspect" Hold_this(flow|set_identification, info) messages. The difference to the blacklist is the absence of a scheduling horizon, and hence this message is forwarded upstream without a (re)calculation of the scheduling horizon. After a flow's blacklist local re-entry or another set of rules, this message can be sent as an early warning for a programmable number of stages upstream. Congesting suspects are kept on the graylist, thus also helping future packet marking upstream. An expensive histogramming method, for example, is not needed. The graylist also improves marking accuracy in multiple-hotspot scenarios.

The greylist can be used for marking "congestion culprits". If a flow or stream is graylisted in a node and later on a sizable, determined fraction of packets matching this flow are causing locally incipient congestion, i.e. this node becomes congestion root, then these packet flows are black-listed.

Elaborations on the BFC

Herein, under the various packet data streams or flows it is distinguished between so-called hot flows or streams and cold flows or streams as explained in more detail below. Hot flows group into a congestion culprit set (CC-set). The congestion culprit set (CC-set) is a group of hot flows that share at least one common hot path segment, i.e. a bottleneck link, between their various sources and (potentially all different) destinations. Within the switch fabric built of high-degree switching nodes (8, 32, 256 ports), the flows of a CC-set may converge and share one or a few segments, then diverge and possibly merge and diverge again; adaptive routing and dynamic load balancing yield such routing graphs.

Grouping into CC-sets exploits the features of either a static (source-based) or a dynamic look-ahead routing scheme. If to each blacklist entry a count L, that is the number of hops from the hotspot root, is added, L can be compared against the routing path downstream of each data packet. If an incoming data packet being compared is not matched as a known hot culprit—because it doesn't have one blacklist entry—this is still not sufficient to declare it "cold" and forward it downstream. The data packet may share two or more segments (up to L) with any of the previously blacklisted flows, which serve as CC-set representatives; in this case, the current packet is declared "hot" and subjected to the same restrictions as its CC-set representative—even though the current packet (its flow) was not nominally blacklisted. The advantage is that there is no need to increase the FC signaling overhead and the blacklist table sizes. The CC-set grouping is considered as a desirable optimization, beneficial in a practical implementation of BFC. Also it may benefit the future adaptive routing and load balancing methods.

Expedited Upstream Signaling (Static/Dynamic Saturation Tree Control)

As a dynamic flow and congestion control (FCC) mechanism, BFC is designed to work in conjunction with, or without, a source-based static congestion management (CM) mechanism that provides adequate source behavior, e.g. fair rate adjustments, during steady-state saturation trees. If both BFC and CM are present, then BFC supports CM as follows:

If one congestion message, i.e. Hold( ) message, is re-entered two or more times in the same blacklist, or if the scope_K of the Hold( ) is cleared to 0, this event generates a so-called backward explicit FC notification (BECN), with expedited propagation all the way towards the sources. The number of blacklist re-entries to trigger this expedited notification is programmable.

An expedited propagation has two advantages. First, congestion control and management signaling is accelerated; for sustained hotspots—when CM is appropriate, CM BECN signaling is faster. Second, the packet marking accuracy improves. A node generates expedited BECNs with a higher confidence, and only sends them to the affected source(s) when appropriate. In this way, there are fewer false CM notifications. A reason of inaccuracy is the fact that marking is solely based on a buffer's occupancy in a single node, neither further validated locally by re-sampling (repetitions) nor in other nodes that could also be hotspotted by the same flows.

Finally, an expedited BECN is usable for both the graylist and as an immediate Hold_this( ), whose corresponding entry will be eventually cleared by either one CM special message, e.g. test packet (TP), or by an attraction event, e.g. a special type of link-level flow-control credit.

Vice versa, CM also supports BFC. If every table entry also stores the source identification along with other data, e.g. destination identification, scheduling horizon, occupancy count, then the congestion-managed traffic sources can remove their own GL entries after the respective hot flows were notified by BECNs. For example, one special test packet (TP) per such BECN-notified flow will clear its entries from all the GL tables along the path from the sources to the hotspot. This helps table management by reducing the number of active entries and their search/match time.

Figure 1:
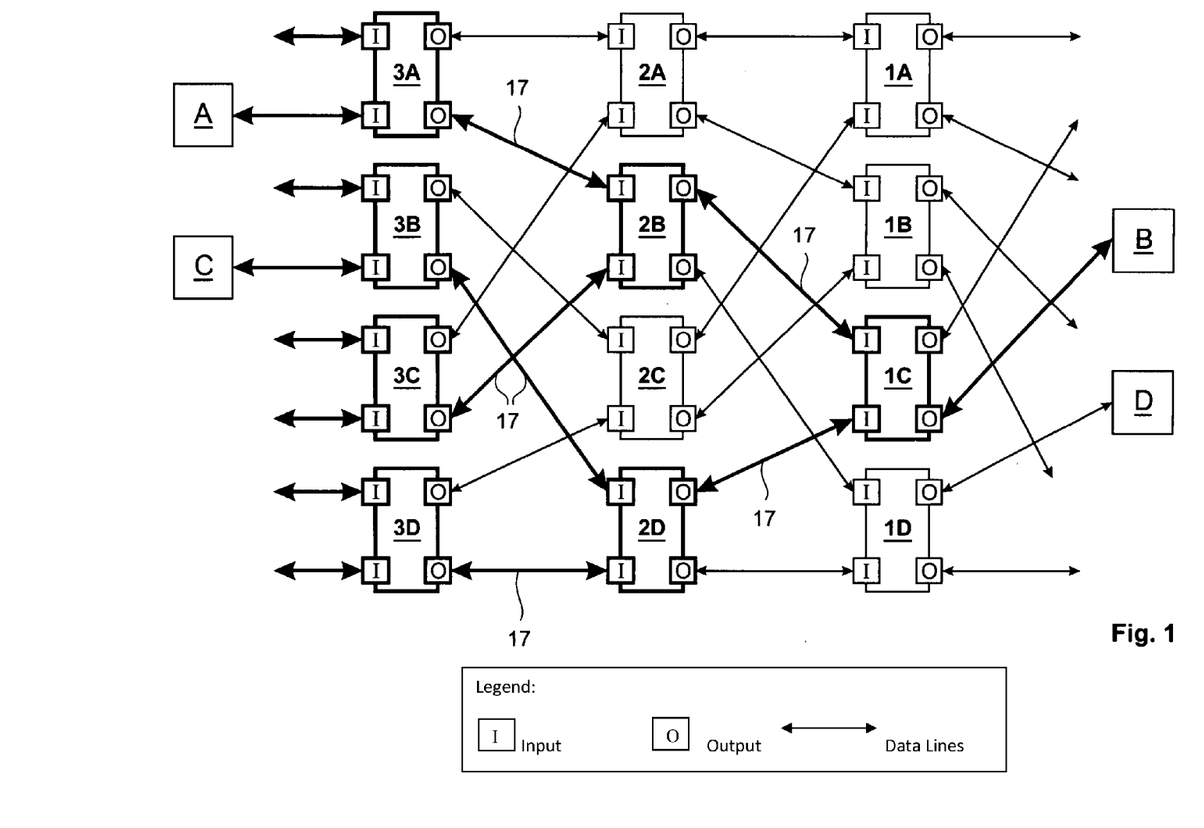
FIG. 1 schematically illustrates a data network with several stages of nodes.

Turning now to the description of the figures, where FIG. 1 illustrates a network of nodes 1A, 1B, 1C, 1D, 2A, 2B, 2C, 2D, 3A, 3B, 3C, 3D with three stages. The nodes are implemented as switches in this embodiment of the network. The nodes are part of an arbitrarily arranged network with many nodes that is used for transmitting data packets from a source to a destination. Depending on the network, the nodes could also be implemented as routers, computers or other machines that receive data packets and transmit the data packets to other nodes and thus act as switches.

In the depicted embodiment each of the nodes comprises two inputs I and two outputs O that are connected with inputs or outputs of other nodes by data lines, as indicated by arrows. Data flows are flowing downstream and control information is flowing in the opposite direction, i.e. upstream. In the known congestion controlling methods a tree of upstream nodes is blocked if a congestion globalizes. They make no differentiation between data packets that cause the congestion and data packets that are only victims of the congestion if "culprits" and "victims" share the same buffer. If in the shown FIG. 1 the output port connected with destination B is congested, all upstream nodes that have a direct or indirect connection with that output port are blocked as indicated by the thicker arrows forming a saturation tree 17. Even some flows that do not contribute to the congestion, e.g. the data path between a source node C or node A and the destination node D, are blocked.

Figure 2:
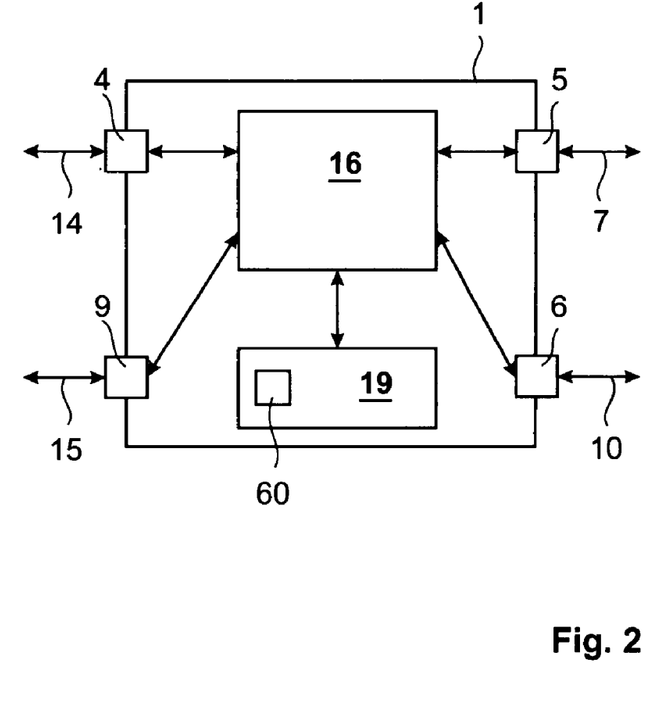
FIG. 2 depicts one node with two input ports and two output ports.

FIG. 2 depicts in more detail a local or first node 1 comprising a first and second input port 4, 9 and a first and second output port 5, 6. The output ports 5, 6 of the first node 1 are connected to a first and second link 7, 10. The first input port 4 of the first node 1 is connected to a third link 14. The second input port 9 is connected with a fourth link 15. A link constitutes a data line that is used for sending data packets downstream and that is used for sending control information and messages upstream. The input and the output ports 4, 9, 5, 6 are connected with a first buffer 16, also referred to as local memory 16. The first buffer 16 is controlled by a local or first processing unit 19.

The data packets are received by the first or the second input port 4, 9, and stored in the buffer The first processing unit 19 checks the header of the data packet for determining the output port 5, 6 to which the data packet is to be delivered.

The data packets comprise header and payload information. The header comprises a source address from which the data packet comes and a destination address to which the data packet is to be sent. Depending on the destination address, the first processing unit 19 chooses the suitable output port 5, 6 to transmit the data packet to the respective destination address. The first processing unit 19 comprises an additional memory 60 in which a black- and graylist and routing table are stored to determine whether the data packet should be transmitted on the first or the second output port 5, 6, depending on a destination address of the data packet.

The first and the second output port 5, 6 can also be used for receiving congestion messages that were sent from a downstream node. A received congestion message is stored in the first buffer 16, or in the additional memory 60 of the first processing unit 19. The congestion messages are checked by the first processing unit 19 and depending on the congestion message only data packets not suspected of generating congestion in a downstream node will be transmitted through the first or the second output port 5, 6.

Furthermore, the first processing unit 19 monitors the data packets destined for output ports 5, to detect an emerging congestion on output ports 5, 6 before a congestion globalizes. An emerging congestion on an output port is detected by the first processing unit 19 if the number of data packets waiting for that port exceeds a given threshold. Of course, other methods could be used for detection. If the first processing unit 19 detects an emerging congestion, the first processing unit 19 generates a first congestion message and sends the first congestion message upstream by the first or the second input port 4, 9, or both.

Figure 3:
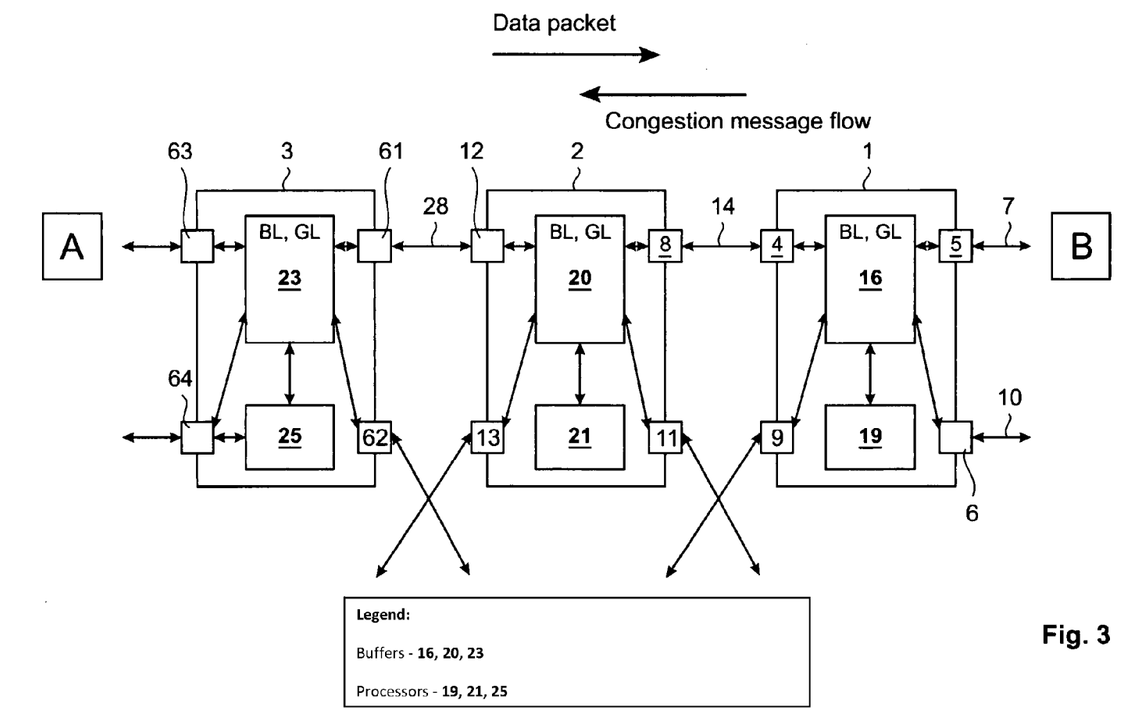
FIG. 3 shows a more precise view of a network with nodes.

FIG. 3 shows a part of a network with the first, a second and a third node 1, 2, 3, the first, the second and the third node 1, 2, 3, being identically structured in this embodiment. The third link 14 is connected to a third output port 8 of the second node 2. The second node 2 comprises a fourth output port 11 and a third and fourth input port 12, 13. The third input port is connected by a fifth link 28 to a fifth output port 61 of the third node 3. The third node 3 comprises furthermore a sixth output port 62 and a fifth and sixth input port 63, 64. The fifth and the sixth input port 63, 64 are connected to further links respectively, e.g. as indicated the fifth input port 63 to source address A. The ports 9, 11, 13, 62 are also connected to further links.

The second node 2 comprises a second buffer 20 that is connected to the input and output ports 12, 13, 8, 11. The second buffer 20 is controlled by the second processing unit 21, also referred to as further processing unit 21. The third node 3 comprises a third buffer 23, that is connected with the fifth and sixth output and with the fifth and sixth input ports 61, 62, 63, 64. The third buffer 23 is controlled by a third processing unit 25.

In the shown embodiment, the data packets are transmitted from the left side to the right side as indicated by the arrow that is arranged above the nodes 1, 2, 3. A data packet comprises a header and preferably a payload information. In the header, an identifier or identifier information for the data flow or stream is stored to which the packet belongs. The identifier comprises a source address and the destination address. The data packets of one data flow comprise the same source and the same destination address. If one data flow is transmitted from source address A to a first destination address B, then the data packets are sent to the fifth input port 63 of the third node 3. From the fifth input port 63, the data packets are stored in the third buffer 23. The third processing unit 25 checks the header of the data packets for retrieving the destination address. The third processing unit 25 detects the first destination address B as a destination address and sends a control signal to the third buffer 23 to deliver the data packets to the fifth output port 61. From the fifth output port 61, the data packets are sent to the third input port 12 over the fifth link 28.

From the third input port 12, the data packets are stored in the second buffer 20. The second processing unit 21 checks the header of the stored data packets and detects the destination address B. Therefore, the second processing unit 21 controls the second buffer 20 to deliver the data packets to the third output port 8. From the third output port 8 the data packets are transferred over the third link 14 to the first input port 4 of the first node 1.

From the first input port 4, the data packets are stored in the first buffer 16. The headers of the stored data packets are checked by the first processing unit 19 for detecting the destination address. In this embodiment, the headers of the data packets comprise the first destination address B that can be reached by using the first output port 5. Therefore, the first processing unit 19 controls the first buffer 16 to deliver the data packet to the first output port 5.

The data packets that are stored in the first buffer 16 and dedicated for the first destination address B are put out over the first output port 5 to the first link 7 that is connected with the first destination address B. If the transmitting capacity of the first link 7 is less than the rate of data packets that were delivered by the first and second input port 4, 9 to the first node 1 to be transmitted over the first link 7, a congestion emerges in the first buffer 16 related to the first output port 5.

The occupancy of the first buffer 16 related to the first or second output port 5, 6 is monitored by the first processing unit 19. An emerging congestion is detected by the first processing unit before the congestion globalizes. If the first processing unit 19 detects an emerging congestion in the first buffer 16 for the first and/or second output port 5, 6, the first processing unit 19 checks the stored data packets that are suspected of congestion for packet marking. The identifier of one or more data flows to which the suspect data packets belong are used in the congestion messages.

Furthermore, the first processing unit 19 calculates in a advantageous embodiment a first hold time T1 during which no further data packets, destined for the congested first output port 5, should be transmitted to the first node 1, i.e. the first buffer 16, to counteract the spreading of a saturation tree. The first processing unit 19 generates a first congestion message comprising the first hold time T1 and an output port identifier for the output port at which a congestion emerges, assuming the first node 1 is the root/origin of the congestion.

The first hold time should be calculated to counteract a saturation tree that is originated by a congestion of data packets and to ensure that enough data packets are stored in the first buffer for utilizing the available transmitting capacity of first or second output port 5, 6 and the first or second link 7, 10. The first hold time T1 is calculated related to the transmitting capacity of the first link 7 and the amount of data packets that are stored in the first buffer 16—dedicated to the first output port 5. Furthermore it is advantageous to consider the time the congestion message takes to go up to the next node and the time a data packet takes to flow down from the upstream node to the node from which the congestion message was sent. This time is named round trip time (RTT). Considering the RTT in calculating the hold time results in a more precise controlling method for counteracting saturation trees and concurrently avoiding depleting the first buffer 16 of data packets so that the available transmitting capacity of the first output port 5 can be used efficiently. For using the round trip time it is helpful to measure RTT or to have a look-up table in which the RTT of the next upstream node is stored.

In an advantageous embodiment, the first processing unit 19 calculates the duration of the hold time in the following manner: NCP=sum of occupancies of the first input buffer 16 for an output, i.e., the number of data packets that are currently not on hold, where the hold time is calculated in packet cycle times: Hold time=max(NCP−RTT, 0), where RTT is the round trip time expressed in number of packet cycles. If the hold time is zero, preferably no congestion message is sent. The abbreviation NCP stands for the number of cold packets that can flow through the first output port 5 without congestion. The number of cold packets is a firstorder approximation of the number of freely moving packets, belonging to cold flows, i.e. the flows that are not congestion culprits. The cold flows are expected to flow uninhibited; however, unlike the hot flows that cause congestions, they may cause buffer underflow.

The hold time is calculated such that new data packets arrive just in time to prevent an underflow of the buffer for a given output port. The packets of the hot (congestion-causing) flows that are on hold locally in a buffer do not move and therefore their number does not appear in the calculation. The subtraction of RTT from the NCP is a compensation for two delays: first, it compensates for the time it takes the congestion message to travel upstream to the next node and second, it compensates for the time it takes a data packet to travel from the upstream node once the hold time has expired down to the node which sent the congestion message. Congestion messages with hold times are only sent if the hold duration is not zero. The hold time is in this embodiment expressed in time units of a packet cycle within the node. The hold time is used in the transmission scheduling of an upstream node. As long as the hold time has not expired, the transmission scheduling will not schedule any data packets that the hold function of the congestion message applies to. The transmission scheduling horizon is the time when the hold time expires. The hold time is part of the congestion message and tells the upstream nodes how long data packets of culprit data flows have to be held back.

Depending on the embodiment of the transmission schedulers (TXS), data packets belonging to different data flows may be transmitted by a transmission scheduler where the congestion may arise caused by a determined data flow. Other data flows can still be transmitted over the first link 7 without any congestion. Therefore, it is useful to detect which data flows are causing a congestion.

After detecting an emerging congestion in the first buffer 16 and generating the first congestion message, the first processing unit 19 sends the first congestion message over the third link 14 upstream to the second node 2 that is arranged directly upstream of the first node 1, and possibly also on other ports/links, such as the second input port 9. The first congestion message is received by the third output port 8 and stored in the second buffer 20, or control unit 21, for example. The first congestion message is analyzed by the second processing unit The second processing unit 21 detects the information about the congested output port in the first node 1. The first congestion message can be constituted as an output port message at the root node of the congestion comprising a port identifier for the congested output port and a hold time. In the node upstream from the root node of the congestion, the first congestion message is transferred to a second congestion message, also referred to as data flow message. Generally, the output port message, i.e. the first congestion message, applies to all data packets travelling to the indicated congested downstream output port and is sent upstream from the node with a hotspotted output, e.g. from the root node of the congestion.

Normally, the first congestion message or output port message travels only one stage upstream. It may comprise only an output port number. For efficiency, the flow identifiers of all the flows destined for that output port are not put on the blacklist. During the hold duration, the withholding is performed at the transmission schedulers that control which data packets are allowed to travel on the links to the downstream node.

Then, the second processing unit 21 checks the data packets that are stored in the second buffer 20. If the second processing unit 21 detects data packets with an identifier of the blacklist, then these data packets are held back until the first hold time T1 expires naturally or, for example, by an attraction message from the downstream first node 1. The attraction is a message from a downstream stage indicating availability of specific resources. Such an attraction message may comprise an identifier for the data packets that are allowed to be sent by the upstream node (e.g. a credit).

The data packets in the second node 2 that are not destined to a congested output port of the first node 1 are transmitted to the first node 1. Therefore, only the data packets are withheld that probably cause the congestion and the other data packets can freely flow via the first node 1.

The second processing unit 21 monitors the second buffer 20 for detecting an emerging congestion. If the second processing unit 21 detects an emerging congestion at an output port, it analyzes the data packets that cause this congestion and determines the identifier for the data flow to which the data packets belong. The second processing unit 21 generates a second congestion message as described above. The second congestion message comprises an identifier for the data flow of the data packets that are suspected of generating a congestion in the second node 2. The second congestion message can further comprise a second hold time T2 that is calculatable by using the local context (NCP, RTT) of the second node 2. The second congestion message is transmitted over the fifth link 28 to the third node 3.

The data flow message, that is the second congestion message, applies to data packets going to one end destination address. These data packets are identified by the flow identification that is enclosed in a data packet header. The end destination address of the flow identification is put in an entry on the blacklist at the receiving node. The data flow message can only be sent by nodes that are arranged at least one stage upstream from the root node of the congestion. Any of these nodes can recalculate the hold time if it sends the data flow message upstream. The recalculation of the hold time of the data flow message is based on the local number of non-congesting packets, on the local round trip time (RTT) with the next upstream node. The number of non-congesting packets are those data packets that keep flowing while the data flow congestion message travels upstream, while the hold time is active and new data packets are travelling downstream after the hold time expires. As only data packets of specific blacklisted data flows are held, the number of the non-congesting data packets (NCP) is defined by all currently in the local node available data packets not belonging to blacklisted data flows.

If a data flow message is received by the third node 3, the data flow identifier of the data flow message is stored in the blacklist.

Preferably, each node has a blacklist. All data packets belonging to a black-listed data flow are held at an output port until its current hold time expires. Depending on the used identifiers, the identified data flows and/or the data packets predetermined for the identified output port are held back during the respective hold times.

The third processing unit 25 of the third node 3 stores the identifier of the congesting data packets in the blacklist of the third buffer 23. As it is shown, the congestion messages are transmitted in reverse direction with respect to the data packet flow.

In an embodiment, the second processing unit 21 transmits the second congestion message to the nodes that are arranged upstream and connected with the second node 2, although there is no congestion in the second node 2. This approach could be used for an output message and/or a data flow message.

In an advantageous embodiment, the second congestion message comprises an information on the number of stages that the congestion message should automatically be delivered to upstream nodes in the absence of an emerging congestion in the upstream node. Using this feature, the second congestion message is propagated upstream even sooner than the case in which congestion messages are propagated only one stage upstream.

In a further advantageous embodiment, in a local or congested node, a local mask duration is calculated for preventing attracting messages for data packets belonging to data flows that are withheld by the congested node's upstream node. It is not efficient to attract data packets for a congested output that is or will be on hold. Such attracting messages should be masked. The duration of the masking is: =NCP−(RTT/2) in time units of packet cycles, whereby NCP is the sum of data packets that are currently not on hold in the congested node, and RTT describes the round trip time of the input link of the switch with the congested output, which means the time it would take for a control message to travel from a node to an upstream node plus the time it would take for a data packet to travel from the upstream node down to the node that sent the control message. The time when the local masking expires is called the local attraction horizon. When the hold time in an upstream node has expired, that node may start sending new data packets down-stream. At that moment, new attractions should arrive from the downstream switch. The attractions are sent earlier by half of the round trip time to arrive on time. All values are expressed in packet cycles.

In the situation indicated with FIG. 4, there is an emerging congestion at the seventh output port 32 of the fourth node 30, that is the hotspot (HS). The fourth processing unit 65 of the fourth node 30 initiates the transmission of a first congestion message 50 comprising Hold_all information as output port congestion message by the seventh and the eighth input port 33, 34 to the upstream fifth node 35 and the sixth node 36. Here the first congestion message 50 comprises a hold time T and the information that the seventh output port 32 of the fourth node 30 is suffering from congestion. The sixth node 36 withholds data packets that are destined for output port 32 of node 30, and, if the incoming culprit flow persists, a congestion occurs at the output port of node 36 that is connected to the fourth node 30. Then, the fifth processing unit 66 of the sixth node 36 generates itself a second congestion message 51 comprising Hold_this information as data flow congestion message with a further hold time T' and the information which data flow is suspected of causing the congestion. The second congestion message 51 is sent from the sixth node 36 to the upstream nodes. The seventh node 37 stores the identifier of the congesting data packets in the blacklist of the additional memory 39.

In a advantageous embodiment, the second congestion message 51 comprises the information that the data flow congestion message should be delivered to a predetermined number of consecutive stages upstream. In this embodiment the second congestion message should be sent two stages upstream. This means that the sixth node 36, that is the first stage upstream to the fourth node 30, delivers the data flow congestion message upstream to the seventh node 37 and from there one stage further.

The fifth processing unit 66 of the sixth node 36 calculates the hold time of each data flow congestion message it sends. This hold time depends on local NCP and RTT for nodes that are not the root of the congestion as explained above. As it is indicated with FIG. 4, the second congestion message 51 is individually transmitted by node 36 to the next upstream node 37 and, if a congestion occurs, the upstream node generates for itself a further second or data flow congestion message that comprises an identifier for the data packets that cause the congestion at the node and may comprise a hold time.

The seventh node 37 and possible nodes further upstream from the seventh node 37 use the blacklist provided in the additional memory 39 for discriminating the data packets that cause the congestion, the so-called culprit packets, from the data packets that suffer from the congestion without being responsible, the so-called victim packets. If as an identifier the data flow from an end-to-end transmitting path is used for determining the culprit data packets, all data packets belonging to this data flow are blocked in the node if there is a congestion down-stream that is caused by the data flow.

An overview of the operation at the various locations or nodes is given by the following transcription. Assume port 32 of local node 30 is backpressured by a slow consumer at the receiving end of the link (bottleneck). If the arrivals on input ports 33, 34 destined for port 32 exceed the service rate of the bottleneck link, this hotspot triggers the root of one saturation tree. The objective is to counteract the saturation tree, first locally, then globally, without reducing the aggregate network performance.

@Root node 30:
  hotspot (HS) detection at the output port 32 based on buffer status, downstream (rate, no. of credits) and fabric parameters (up/down link RTTs);
  global marking condition>threshold=>all flows going thru output port 32 are considered culprits;
  issue a Congested event=>Hold_all(30|32, scheduling horizon, info) message 50 is sent upstream to upstream nodes 35, 36

@ k=1 upstream nodes 35,36:
  receive Hold_all(30|32, scheduling horizon, info) from local node 30;
  store in blacklist BL entry comprising Hold_all information
  if scope_K=0=>expedited forwarding upstream;
  validation of HS event, marking refinement:
    if (t>T_μm OR HS_severity>HS_thshld) AND (buff_occupancy>M_thshld) OR (new arrivals headed to 30|32) then
      for every culprit arrival, or count for all the culprits in buff_occupancy, issue the congestion message 51 as
        Congesting_culprit event=>Hold_this (flow|set_identification, scheduling horizon, info), or
        Congesting_suspect event=>Hold_this (flow|set_identification, info), if under the limits required for Congesting_culprit.

@ k=2 Upstream Node 37:
  receive the congestion message 51 from nodes 35, 36: Hold_all(30|32, scheduling horizon, info), or, Hold_this (flow|set_identification, scheduling horizon, info), or, Hold_this(flow|set_identification, scheduling horizon, info);
  if Hold_this(flow|set_identification, scheduling horizon, info)=>store BL entry representative (any subsequent flow ID matching this will be stopped until the horizon t expires);
  if Hold_this(flow|set_identification, info)=>store GL entry representative (to serve as prime candidate for future marking, should a new HS root appear);
  if scope_K=0=>expedited forwarding upstream;

else (k>0), recalculate the horizon to be sent upstream; issue
Congesting_culprit event=>Hold_this (flow|set_identification, scheduling horizon, info), or
Congesting_suspect event=>Hold_this (flow|set_identification, info), if under the limits required for Congesting_culprit.
...
@ingress sources (if scope_K=0)
receive Hold_all(30|32, scheduling horizon, info), or, Hold_this(flow|set_identification, scheduling horizon, info), or, Hold_this(flow|set_identification, scheduling horizon, info);
perform rate or window adjustment (reduce injections);
after a calculated period send or broadcast downstream a test packet (TP) to clear the GL entries in the nodes.

The advantages of the present invention, however, are not limited to the described embodiments, but could also be used in a data network that is constituted differently, particularly with other kind of switches. The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for counteracting a saturation tree occurring in a network having nodes, comprising:
providing a first list indicating data streams causing a congestion;
providing a second list indicating data streams suspected of causing the congestion;
generating at a local node where the congestion emerges a first congestion information comprising a first identifier identifying a congested channel;
sending the first congestion information to at least one upstream node;
responsive to receiving the first congestion information at the at least one upstream node:
comparing content of the received first congestion information with a present local status based on a set of rules in order to identify at least one packet stream causing the congestion;
storing the first identifier in one of: the first list, and the second list, wherein selecting the first or the second list depends on results of the comparison;
generating a second congestion information comprising a second identifier identifying the at least one packet stream causing the congestion; and
sending the second congestion information to at least one node further upstream from where the identified at least one packet stream was received:
wherein the at least one node further upstream holds back the at least one packet stream identified in the second list.

2. A method according to claim 1, wherein the step of sending the second congestion information comprises
forwarding the second congestion information to a source node from which the identified at least one packet stream originates.

3. A method according to claim 1, wherein the step of generating the first congestion information at the local node further comprises detecting the emerging congestion by applying the set of rules.

4. A method according to claim 1 wherein when the second congestion information comprising the second identifier is sent further upstream, the at least one further upstream node receiving the second congestion information stores in dependence on the set of rules the second identifier in one of the first list and the second list.

5. A method according to claim 4, wherein the second identifier identifies multiple data flows.

6. A method according to claim 4, wherein the second congestion information with the second identifier is sent upstream if the second identifier is stored more than once in the first list.

7. A method according to claim 4, wherein a receiving source node at least reduces the sending of the packet stream identified by the second identifier and sends a test packet to the local node where the congestion emerged, wherein entries of the received second identifier in the second lists are removed along the way of the test packet to the local node where the congestion emerged.

8. A method according to claim 1 further comprising comparing based on the set of rules each identifier of incoming packet streams with the identifiers stored in the second list, and when a condition of the set of rules with respect to one identifier holds, the one identifier is transferred from the second list to the first list, which is a blacklist.

9. A switching fabric for counteracting a saturation tree occurring in a network having nodes, comprising;
- a first list storing identifiers indicating data streams causing a congestion;
- a second list storing identifiers indicating data streams suspected of causing the congestion;
- a local processing unit and a local memory adapted to generate at a local node where a congestion emerges a first congestion information comprising a first identifier identifying a congested channel;
- a local port controlled by the local processing unit for sending the first congestion information to at least one upstream node;
- a further processing unit and a further memory adapted to:
- compare the content of the received first congestion information with a present local status based on a set of rules in order to identify at least one packet stream causing the congestion, and to generate a second congestion information comprising a second identifier identifying the at least one packet stream causing the congestion; and
- store the first identifier in one of: the first list and the second list, wherein selecting the first or the second list depends on results of the comparison; and
- a further port for sending the second congestion information to at least one node further upstream from where the identified at least one packet stream was received:
- wherein the at least one node further upstream holds back the at least one packet stream identified in the second list.

10. The switching fabric according to claim 9, wherein the second congestion information comprises an expedite information and a hold time during which the upstream nodes will hold back the identified at least one packet stream.

11. The switching fabric according to claim 10 wherein entries in the first list are removed after expiration.

12. An article of manufacture comprising a non-transitory computer usable medium having computer readable program code embodied therein for causing counteraction of a saturation tree occurring in a network having nodes, the computer readable program code causing a computer to effect the steps of:
- providing a first list storing identifiers indicating data streams causing a congestion;
- providing a second list storing identifiers indicating data streams suspected of causing the congestion;
- generating at a local node where a congestion emerges a first congestion information comprising a first identifier identifying a congested channel;
- sending the first congestion information to at least one upstream node;
- responsive to one received first congestion information:
- comparing content of the received first congestion information with a present local status based on a set of rules in order to identify at least one packet stream causing the congestion, storing the first identifier in one of: the first list, and the second list, wherein selecting the first or the second list depends on results of the comparison;
- generating a second congestion information comprising a second identifier identifying the at least one packet stream causing the congestion; and
- sending the second congestion information to at least one node further upstream from where the identified at least one packet stream was received;
- wherein the at least one node further upstream holds back the at least one packet stream identified in the second list.

* * * * *